F. LILLICH.
WHEEL FENDER.
APPLICATION FILED JAN. 30, 1914.
1,118,026.
Patented Nov. 24, 1914.
2 SHEETS—SHEET 2.
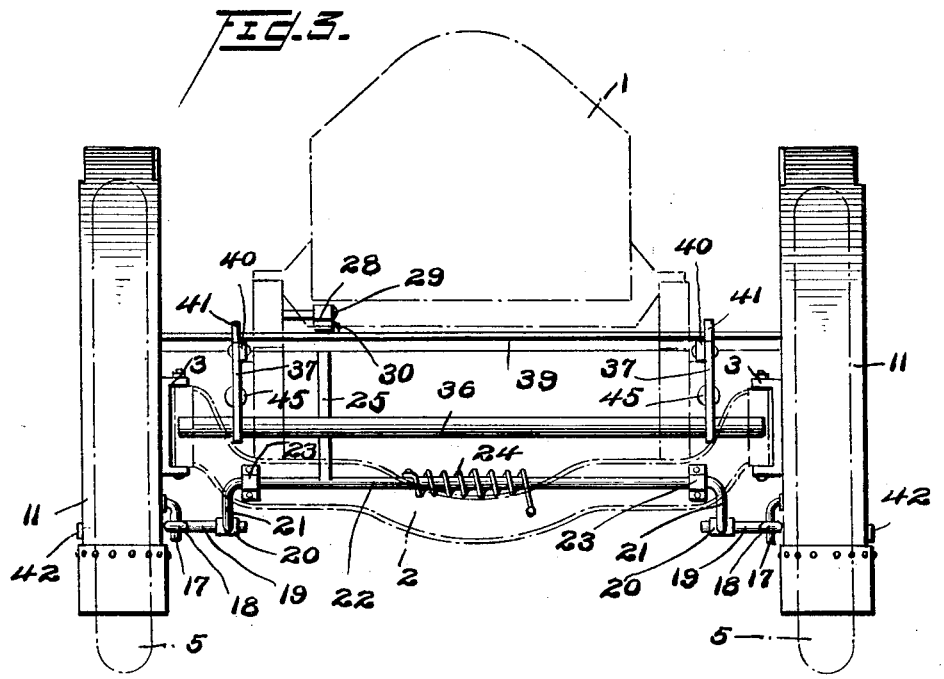
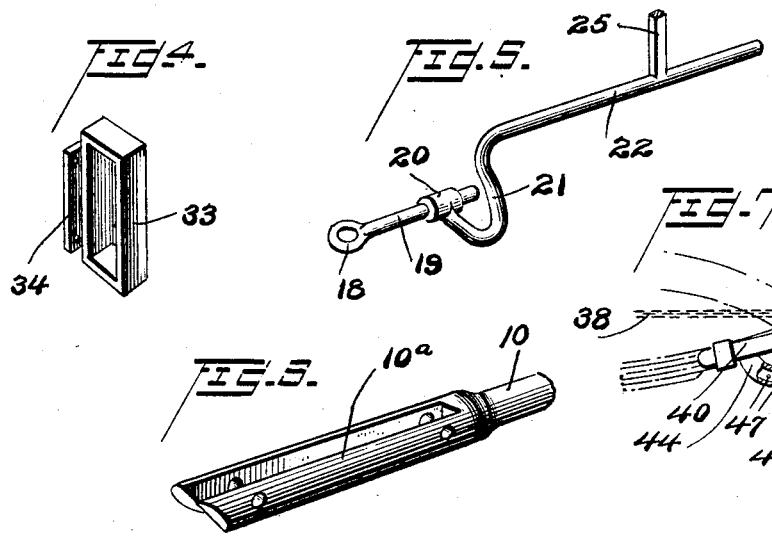
Inventor
Frederick Lillich
By Joshua R. H. Potts.
Attorney
Witnesses
Harold Strauss
C. R. Ziegler

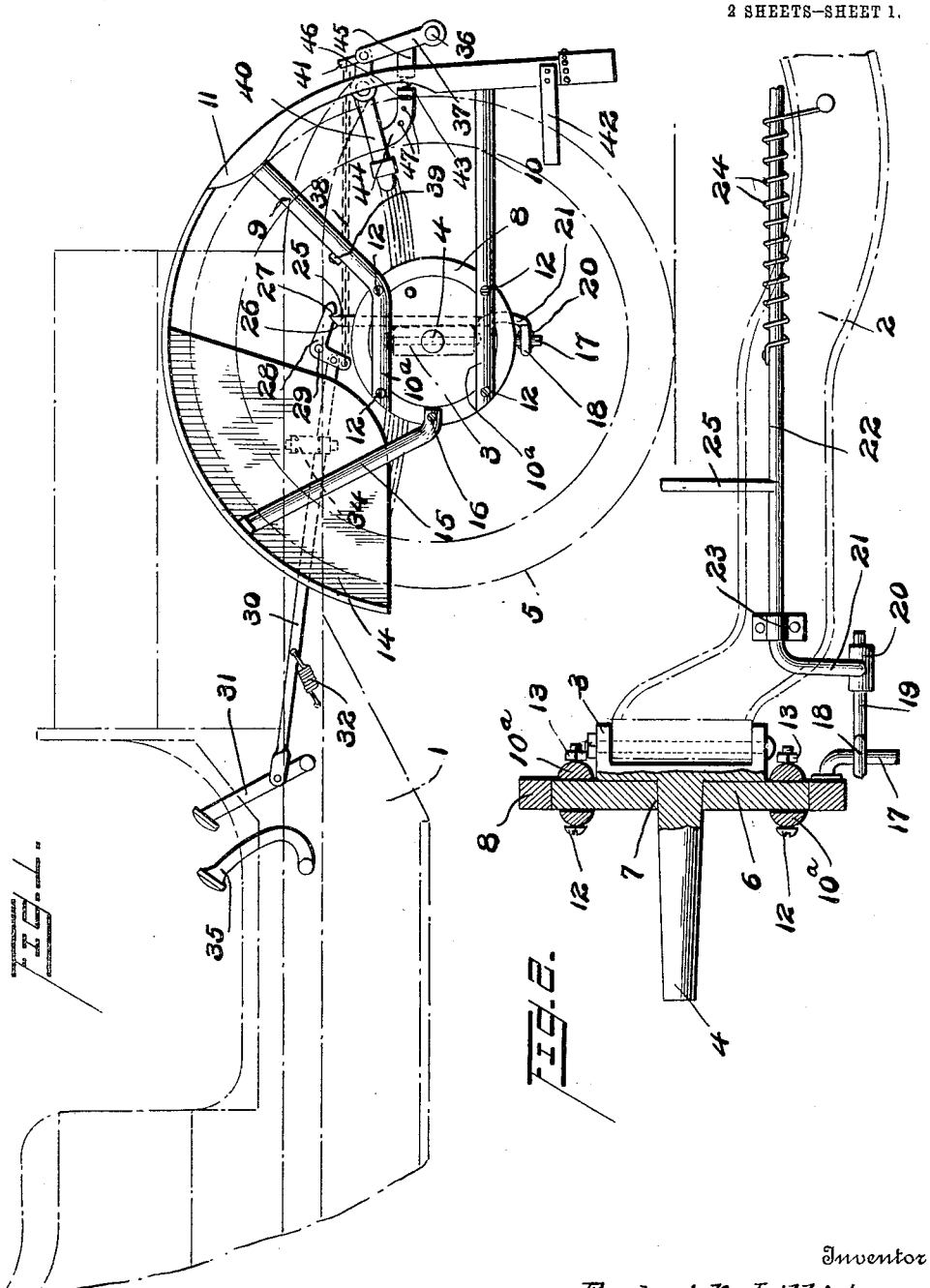

UNITED STATES PATENT OFFICE.

FREDERICK LILLICH, OF PHILADELPHIA, PENNSYLVANIA.

WHEEL-FENDER.

1,118,026.  Specification of Letters Patent.  Patented Nov. 24, 1914.

Application filed January 30, 1914. Serial No. 815,391.

*To all whom it may concern:*

Be it known that I, FREDERICK LILLICH, a citizen of the United States, residing at Philadelphia, in the county of Philadelphia and State of Pennsylvania, have invented certain new and useful Improvements in Wheel-Fenders, of which the following is a specification.

My invention relates to improvements in wheel fenders, the object of the invention being to provide improved fenders for the wheels of vehicles, and primarily for the wheels of automobiles which will, when in operative position, prevent the wheels from passing over a person or object, and which are so mounted relative to the wheels as to permit the latter to be freely moved in steering and which will operate with equal facility in any position of the wheel.

A further object is to provide an improved controlling mechanism for raising the fenders out of contact with the ground and holding them in this elevated position, but permitting said fenders to be released by the operator in the car or by contact of the bumper with the person or object.

With these and other objects in view, the invention consists in certain novel features of construction and combinations and arrangements of parts as will be more fully hereinafter described and be pointed out in the claims.

In the accompanying drawings: Figure 1 is a view in side elevation illustrating my improvements in full lines and showing the same in connection with an automobile, the latter being indicated in dotted lines. Fig. 2 is a fragmentary view partly in front elevation and partly in section illustrating the fender supporting and operating mechanism. Fig. 3 is a view in front elevation illustrating my improved fenders in their positions relative to the front or steering wheels of an automobile. Fig. 4 is a perspective view of the sleeve 23 and bracket 34. Fig. 5 is a fragmentary perspective view of one end of the fender operating shaft. Fig. 6 is a perspective view illustrating one of the fender supporting arms, and Fig. 7 is a fragmentary view in elevation and partly in section illustrating the bumper and its supports.

1 represents the body of an automobile, and 2 the front axle engaging with pivoted forks 3 at its ends, which forks carry axle stubs 4 on which the front wheels 5 are mounted. These front wheels constitute steering wheels, and are operated in any approved manner to swing the forks 3 on their pivot to guide the automobile. On each axle stub 4 I provide a disk 6, which is provided with a central opening 7 to receive the axle stub 4, and is secured against the outer face of the corresponding fork, preferably by brazing, although it may be of course secured in any other way which would prevent movement of the disk independent of the fork. On each disk 6 I provide a ring 8, which is designed to turn freely on the periphery of the disk, and is held against lateral displacement on the disk by the arms 9 and 10 of my improved fender 11. The arms 9 and 10 have bifurcated rear ends 10ª which straddle both the ring 8 and the disk 6. In other words, these forked ends extend over both the inner and outer surfaces of the disk, and are secured at two points to the ring by bolts 12 and nuts 13, so that these bolts and nuts may be readily removed and the fender readily detached from the vehicle. It is to be understood, of course, that the connection of the arms 9 and 10 of the fender are such as will allow them to be moved apart slightly, so that they can be drawn off the disk.

The fender illustrated is of my improved type shown in former applications, Serial Nos. 749,762 and 807,836 respectively, combining with the fender a mud guard 14, the latter having an arm 15 which is secured by a bolt 16 to the rear portion of the ring, so that when the arms 9 and 10 are flared apart to release the disk, this rear arm 15 will support the ring and cause the removal of the ring from the disk when the fender is moved laterally.

On the inner face of the ring 8, preferably at its lower portion, a pin 17 is secured. This pin 17 is bent so as to off-set it slightly from the ring, and at its free end it extends downwardly through an eye 18 at the outer end of a rod 19.

The construction above described in connection with one fender applies alike to both fenders, and each fender has its pin 17 coupled to its rod 19 as above explained.

The rods 19 project through sleeves 20 on crank arms 21 at the ends of an operating shaft 22. This shaft 22 is preferably supported in bearings 23 on the front axle 2, and is provided with a coiled spring 24 which tends normally to turn the shaft in a direction to force the fenders downwardly, assisting gravity to insure a quick operation. This shaft 22 is provided with an upwardly projecting crank arm 25 having a beveled free end 26 adapted to engage in a notch 27 in a pivoted catch 28 provided to hold the shaft against turning movement and maintain the fender in its normal elevated position, as is indicated in Fig. 1.

The fenders may be elevated by manually moving them through the medium of any approved mechanism, and as this lifting mechanism forms no part of the present invention, it is not necessary to set forth the same in this application.

The catch 28 is in the form of an angle lever with the pivot 29 at the angle, and the forwardly projecting member of the catch or angle lever constituting the crank arm engaging member. The other arm or member of the catch extends downwardly, and is connected by a link 30 with a foot lever 31, and a spring 32 connects the link 30 with the body 1 of the vehicle to hold the parts in normal position.

The link 30 is movable in an angular sleeve 33 on a guide bracket 34 secured to the body of the vehicle, and it will be noted, particularly by reference to Fig. 1, that the foot lever 31 is located in proximity to a brake lever 35. This is a convenient location of parts because the operator with his foot upon the brake lever can extend the toe of his shoe from the brake lever far enough to engage the foot lever 31 and release the catch 28 by a downward pressure of the foot.

36 represents a bumper supported by the arms 37, which are pivotally connected at their upper ends to the forward ends of the brackets 40. The brackets 40 are preferably secured to the frame of the vehicle. I have indicated them as secured directly to the spring as well as to the forward end of the frame, but the exact connection is, of course, immaterial. On the upper ends of one arm 37, a finger 41 is located, and is connected by a chain 38 with the catch 28, so that the movement of the bumper rearwardly by reason of contact with the person or object, will cause the catch to be released. Also any downward movement of the bumper will release the catch. This is desirable because it is not only necessary to release the fenders when a body or person is engaged by the bumper, but frequently a person will catch hold of the bumper and exert a downward pull thereon. This will also release the catch and allow the fenders to fall.

To hold the bumper in its normal position, I provide coiled springs 43, which are housed in tubular extensions 44 and 45, respectively, on the brackets 40 and arms 37, having their ends in substantial alinement. Pins 46 are located in any of a series of holes 47 in the tubular extensions 44, so that by the movement of these pins, the tension of the springs can be adjusted.

To insure the simultaneous operation of the wheel fenders, I preferably connect the arms 9 by a rod 39, as clearly shown.

It will be noted that with my improvements, the steering wheels 5 on the stubs 4 may be turned at any angle without interfering with the fenders or other controlling mechanism. The pins 17 are free to turn in the eyes 18, and the rods 19 can slide longitudinally in the sleeves 20, thereby forming in effect a universal connection so that the parts will move with equal facility at any angular relation to each other.

My improvements can be attached to any ordinary vehicle, and by reason of the construction above described, the fenders may be readily removed, whenever desired, by simply removing the wheels and then disconnecting the bolts 12, so that the rings 8 may be moved off the disks 6.

To prevent any possibility of lateral movement of the fender beyond a point which might tend to break the same, I provide on the fenders rearwardly projecting bars 42, which when any undue strain laterally is had upon the fender, will strike the wheel rim. This construction is desirable in localities where snow is liable to accumulate and form rough spots or ridges, and might give a lateral strain to the fender when in contact with the same. The bars 42 therefore protect against this injury.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a disk, of a ring mounted to turn on the disk, a fender, and arms secured to the fender and having bifurcated portions straddling the disk and secured to the ring, substantially as described.

2. The combination with a disk, a ring mounted to turn on the disk, a fender, arms secured to the fender, said arms at their ends having bifurcated portions straddling the disk and the ring, and removable devices projected through the ring and through the arms securing them together, substantially as described.

3. The combination with a disk, of a ring mounted to turn on the disk, a fender, and arms secured to the fender and having bifurcated portions straddling the disk and secured to the ring, a pin on said ring, and a crank shaft operatively engaging the pin whereby the movement of the shaft causes the movement of the ring and the fender, substantially as described.

4. The combination with a disk, a ring mounted to turn on the disk, a fender, arms secured to the fender, said arms at their ends having bifurcated portions straddling the disk and the ring, removable devices projected through the ring and through the arms securing them together, a pin on said ring, and a crank shaft operatively engaging the pin whereby the movement of the shaft causes the movement of the ring and the fender, substantially as described.

5. The combination with an axle, and stubs pivotally connected to the ends of the axle, of disks secured to the stubs, rings mounted to turn on the disks, fenders, arms securing the fenders to the ring and straddling the inner and outer surfaces of the disks, pins on the rings, a crank shaft mounted on the axle, said crank shaft at its ends being operatively connected with the pin, and a spring tending to turn the shaft in a direction to force the fenders downwardly, substantially as described.

6. The combination with an axle, the stubs pivotally connected to the ends of the axle, of disks secured to the stubs, rings mounted to turn on the disks, fenders, arms securing the fenders to the ring and straddling the inner and outer surfaces of the disks, pins on the rings, a crank shaft mounted on the axle, crank arms on the ends of the shaft having sleeves at their free ends, rods movable longitudinally in the sleeves and having eyes receiving the pins, and a spring exerting pressure on the shaft tending to turn the same in a direction to force the fenders downwardly, substantially as described.

7. The combination with an automobile, of disks secured to and movable with the steering wheel supporting-stubs, rings mounted to turn on the disks, fenders secured to the rings, a crank shaft supported on the axle of the automobile, said crank shaft being operatively connected to the rings, a crank arm on said shaft having a beveled end, a pivoted catch normally engaging said beveled end and holding the fenders in elevated position, and a foot lever located in juxtaposition to the brake lever of the automobile and adapted when moved to release the catch, substantially as described.

8. The combination with an automobile, of disks secured to and movable with the steering wheel supporting-stubs, rings mounted to turn on the disks, fenders secured to the rings, a crank shaft supported on the axle of the automobiles, said crank shaft being operatively connected to the rings, a crank arm on said shaft having a beveled end, a pivoted catch normally engaging said beveled end and holding the fenders in elevated position, a foot lever located in juxtaposition to the brake lever of the automobile, and adapted when moved to release the catch, a bumper, and means connecting the bumper with the catch, whereby the movement of the bumper operates to release the catch, substantially as described.

9. The combination with an automobile, of disks secured to and movable with the steering wheel supporting-stubs, rings mounted to turn on the disks, fenders secured to the rings, a crank shaft supported on the axle of the automobile, said crank shaft being operatively connected to the rings, a crank arm on said shaft having a beveled end, a pivoted catch normally engaging said beveled end and holding the fenders in elevated position, a foot lever located in juxtaposition to the brake lever of the automobile, and adapted when moved to release the catch, brackets secured to the automobile, arms pivotally connected to the brackets and supporting at their lower ends a bumper bar, a finger on one of said arms, a flexible connecting device between the finger and the catch, and springs exerting outward pressure on the arms, substantially as described.

10. The combination with a vertically disposed disk, a ring mounted to turn on the disk, a fender, and means securing the fender to the ring and holding the ring on the disk, substantially as described.

11. The combination with a vertically disposed disk, a ring mounted to turn on the disk, a fender, and means for preventing lateral movement of the ring on the disk, said last-mentioned means supporting the fender, substantially as described.

12. The combination with a vertically disposed circular member, a ring mounted to turn on the circular member, a fender connected to the ring, and devices secured to the ring and overlapping the circular member for preventing lateral movement of the ring on the circular member, substantially as described.

In testimony whereof I have signed my name to this specification in the presence of two subscribing witnesses.

FREDERICK LILLICH.

Witnesses:
M. E. DITTUS,
CHAS. E. POTTS.

Copies of this patent may be obtained for five cents each, by addressing the "Commissioner of Patents, Washington, D. C."